United States Patent [19]
Jornod et al.

[11] Patent Number: 5,153,493
[45] Date of Patent: Oct. 6, 1992

[54] NON-BRIDGE TYPE ELECTRONIC ACTUATOR CONTROL

[75] Inventors: Eugene R. Jornod; Lary L. Field, both of Caledonia; Fred Fauerbach, Roscoe, all of Ill.

[73] Assignee: Barber-Colman Company, Rockford, Ill.

[21] Appl. No.: 650,074

[22] Filed: Feb. 4, 1991

[51] Int. Cl.$^5$ ............................................. G05B 11/36
[52] U.S. Cl. .................................... 318/609; 318/663
[58] Field of Search ............... 318/609, 434, 466–470, 318/610, 626, 663, 615

[56] References Cited

U.S. PATENT DOCUMENTS

| | | | |
|---|---|---|---|
| 2,403,917 | 7/1946 | Gille | 236/1 |
| 2,435,966 | 2/1948 | Isserstedt | 318/29 |
| 2,704,819 | 3/1955 | Bishofberger et al. | 318/29 |
| 2,758,269 | 8/1956 | Gille | 318/28 |
| 3,260,908 | 7/1966 | Bostwick | 318/28 |
| 3,405,335 | 10/1968 | Inose et al. | 318/18 |
| 3,714,537 | 1/1973 | Bur | 318/466 X |
| 3,742,327 | 6/1973 | Nettles | 318/615 X |
| 3,824,439 | 7/1974 | Pinckaers | 318/667 |
| 4,087,728 | 5/1978 | Porter | 318/466 |
| 4,250,441 | 2/1981 | Chapman | 318/626 |
| 4,258,877 | 3/1981 | White | 236/49.3 |
| 4,303,873 | 12/1981 | Hawkins | 318/434 X |

Primary Examiner—William M. Shoop, Jr.
Attorney, Agent, or Firm—Leydig, Voit & Mayer

[57] ABSTRACT

A quick-calibrate control module for use in a heating and cooling system is provided which responds to setpoint signals from a control potentiometer to drive a remote actuator to corresponding positions. The control module comprises a motor coupled to the actuator and a feedback potentiometer coupled to the motor for producing a feedback signal relating to the actuator position. Operational amplifiers combine the setpoint signal and the feedback signal to produce an error signal, and a comparator responds to the error signal and drives the motor to minimize the error signal. A reference supply is connected to the control potentiometer, the reference supply having a zero setting potentiometer which calibrates the closed position of the actuator to a corresponding zero setting of the control potentiometer. A stroke adjustment potentiometer scales the feedback signal to calibrate a desired open position of the actuator with a corresponding setting of the control potentiometer. The amplifiers also prevent cross-loading of the reference supply and the stroke adjustment potentiometer, so that stroke adjustments can be made without altering the zero setting of the actuator.

17 Claims, 2 Drawing Sheets

NON-BRIDGE TYPE ELECTRONIC ACTUATOR CONTROL

FIELD OF THE INVENTION

The present invention relates to electronic motor controls for heating and cooling systems, and more particularly, to electronic motor controls having an electronic stroke adjustment for controlling the position of a load device such as an actuator.

BACKGROUND OF THE INVENTION

Closed loop motor control circuits for controlling the positioning of a valve, damper, actuator, or similar load device are well known in the prior art. Moreover, some prior motor control circuits included devices for adjusting the electronic stroke of the motor used to drive the load device. By including stroke adjustment devices, these control circuits attempted to make it possible for a user to adjust the magnitude of the rotation of the load device. However, the design of many of these electronic stroke adjustment circuits was such that adjustment of the electronic stroke caused variations on both ends of the stroke. Therefore, if a particular load device required a fixed position, such as a fixed closed position of a damper in a heating and cooling system, these motor control circuits were not entirely suitable because adjustment of the electronic stroke would alter the closed position of the load device.

In an attempt to correct this problem, specialized electronic stroke adjustments for heating and cooling system motor controls were developed, such as that shown in U.S. Pat. No. 3,824,439 to Pinckaers. The '439 patent discloses a closed loop motor control circuit based on a balanced Wheatstone bridge and having a motor which controls the position of a load device such as a valve or damper from a fixed closed position to an open position. This circuit also provides an electronic stroke adjust which attempts to allow the adjustment of the open position of the valve for a given control signal without any change of the fixed closed position.

Referring to FIG. 3 which shows the circuit of the '439 patent, a closed loop motor control circuit is shown having a control potentiometer 138 and a feedback potentiometer 130 connected in a balanced Wheatstone bridge 120, and an electronic motor control 122 which senses the bridge output and drives the motor 124 depending on whether the bridge is balanced. An extremely important feature of the '439 control circuit is that in order for bridge 120 to be balanced, a wiper 128 of feedback potentiometer 130 must be at a virtual center point 134 of bridge 120 when valve 126 is at the fixed closed position, so that the resistive values of feedback potentiometer 130 and a resistor 140 are identical.

In the control circuit of the '439 patent, when wiper 128 of feedback potentiometer 130 is at virtual center point 134, bridge 120 is symmetrical and the potential at terminals 142 and 152 connecting a stroke adjust potentiometer 160 are the same. Therefore, stroke adjust potentiometer 160 has no effect on the bridge output signal, and any adjustment of potentiometer 160 will not affect the closed position of valve 126. When wiper 128 of feedback potentiometer 130 moves off virtual center point 134 to rebalance bridge 120, stroke adjust potentiometer 160 adjusts the value of the bridge impedance. Thus, in order to rebalance bridge 120 for two different settings of stroke adjust potentiometer 160, the motor 124, valve 126 and wiper 128 must drive farther with a lower setting of stroke adjust potentiometer 160.

The design of the motor control circuit disclosed in the '439 patent has proven problematic in several respects. For example, the control circuit does not include a device for calibrating the zero setting or fixed closed position of the valve. As is often possible, if valve 126 is not properly positioned at the desired closed position for a corresponding control signal, the zero setting must be calibrated. In order to do this without mechanical adjustment of the feedback potentiometer, some type of electrical zero setting device connected to bridge 120 would be useful for calibrating the zero setting of valve 126. However, because the control circuit uses a balanced Wheatstone bridge circuit, the zero setting device most likely will cause bridge 120 to become unbalanced when the zero setting of valve 126 is calibrated, or will alter the gain of the bridge with respect to given control signals. As stated above, when bridge 120 is not balanced, any adjustments to stroke adjustment potentiometer 160 will affect the bridge output signal and can therefore alter the fixed closed position of valve 126. If the zero setting and stroke adjustment settings affect each other, as they likely will in this type of arrangement, calibration of the system can become more complex, requiring a higher level of skill on the part of the technician, or a lower expectation of proper calibration on the part of the user.

In most heating and cooling systems, it is expected that the motors and their control circuits eventually must be replaced. However, the use of prior art motor control circuits for replacement purposes further emphasizes the problems discussed above. For example, when a replacement motor control circuit must be provided, variables such as the unknown wiring resistance of the heating and cooling system can significantly affect the operation of the control circuit. Because of such problems, it becomes even more difficult to provide a replacement control module which operates so that stroke adjustments can be made which do not alter the fixed closed position of a load device. Further, although control circuits such as that shown in the '439 patent often have been used as replacement controls, these control circuits do not allow the performance of a quick and uncomplicated calibration of the zero setting of a load device which is independent of stroke adjustments.

SUMMARY OF THE INVENTION

In view of the foregoing, it is a general aim of the present invention to provide a non-bridge type control module for controlling the position of a remote actuator in a heating and cooling system.

In accomplishing that aim, it is an object of the present invention to provide a quick-calibrate control module having a stroke adjustment potentiometer which can be adjusted without altering the zero setting or closed position of an actuator.

It is an additional object of the present invention to provide a replacement control module for use in an existing heating and cooling system for controlling the position of a remote actuator operable such that zero and stroke adjustments can be made independently and without cross loading for simple and efficient calibration.

It is a feature of the control module of the present invention that the control potentiometer is not connected in a bridge as in prior art control circuits, but instead is connected to a reference supply which can be freely adjusted to establish a zero setting independent of stroke adjustments.

It is another feature of the control module of the present invention that the feedback potentiometer and the control potentiometer are connected in isolated circuits, but that a reference signal from the control potentiometer setting is provided to the feedback circuit which does not disturb the desired independence of zero and stroke adjustments.

It is yet another feature of the present invention that the control module can be used as a replacement control module and can produce a signal to position an actuator which is not influenced by the wiring resistance of the existing heating and cooling system.

In accordance with the present invention, a quick-calibrate control module is provided for responding to setpoint signals from a control potentiometer to drive an actuator to corresponding positions. The control module comprises a motor which is coupled to the actuator and a feedback potentiometer which is coupled to the motor for producing a feedback signal which relates to the actuator position. The control module further comprises summing means which combine a setpoint signal from the control potentiometer and a feedback signal to produce an error signal, and means responsive to this error signal for driving the motor to minimize the error signal. A reference supply is connected to the control potentiometer, the reference supply including zero setting means for adjusting the setpoint signal so that the error signal has a level which calibrates the closed position of the actuator to a corresponding setting of the control potentiometer. The control module also comprises scaling means which scale the feedback signal to produce an error signal having a level which calibrates a desired open position of the actuator with a corresponding setting of the control potentiometer. The summing means also include means for preventing cross loading of the reference supply and the scaling means so that the scaling means can be adjusted without altering the zero setting or closed position of the actuator.

Other objects and advantages of the present invention will become apparent from the detailed description given hereinafter. It should be understood, however, that the detailed description and specific embodiments are given by way of illustration only, since various changes and modifications within the spirit and scope of the invention will become apparent to those skilled in the art from this detailed description.

DETAILED DESCRIPTION OF THE PREFERRED EMBODIMENTS

While the invention will be described in connection with a preferred embodiment, there is no intent to limit the invention to this embodiment. On the contrary, the intent is to cover all alternatives, modifications, and equivalents included within the spirit and scope of the invention as defined by the appended claims.

Figure 1:
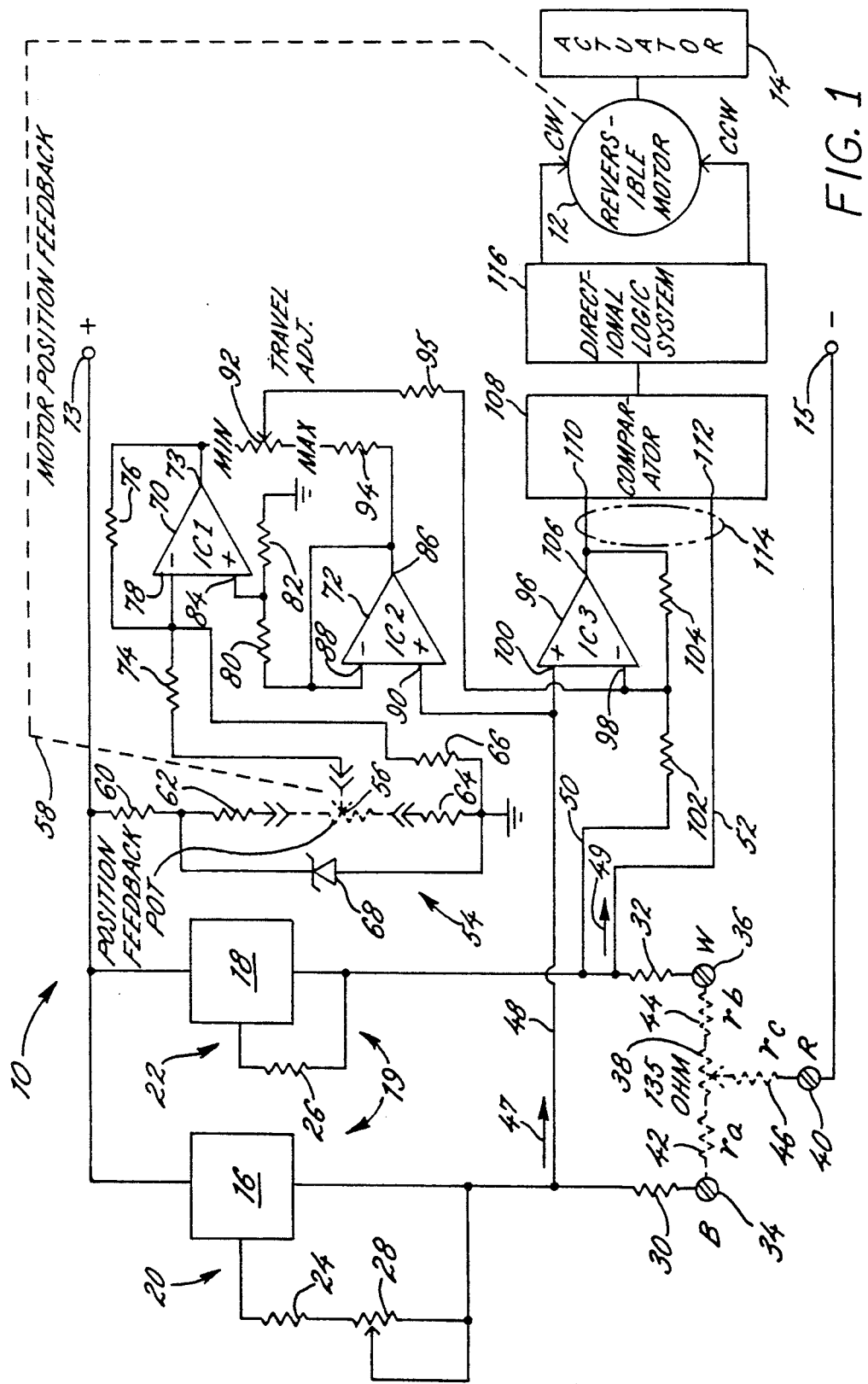
FIG. 1 is a schematic diagram of a preferred embodiment of the control module of the present invention.

Turning now to the drawings, FIG. 1 shows a schematic diagram of a quick-calibrate control module according to a preferred embodiment of the present invention. This illustrated embodiment shows the design of a quick-calibrate control module for use in a heating and cooling system to control the position of a remote actuator in the system between open and closed positions.

As shown in FIG. 1, a quick-calibrate control module 10 controls the operation of a reversible motor 12 in order to position an actuator 14 between open and closed positions. The control module 10 receives power through terminals 13 and 15. In the illustrated embodiment, power is DC with a positive connection at terminal 13 and a negative connection at terminal 15.

In practicing the invention, control module 10 includes a reference supply 19 which is connected to a control potentiometer 38 for producing a differential setpoint signal that drives actuator 14 to corresponding positions. In the illustrated embodiment, reference supply 19 includes a pair of voltage regulators 16 and 18 which are configured as constant current sources 20 and 22 by resistors 24 and 26. Additionally, in order to calibrate the zero setting or closed position of actuator 14, constant current source 20 includes a zero calibration potentiometer 28.

As shown in FIG. 1, constant current sources 20 and 22 feed through resistors 30 and 32 which are connected to terminals 34 and 36, respectively, and control potentiometer 38 is connected between terminals 34 and 36. It should be noted that control potentiometer 38 is shown in broken lines because it is not a component of control module 10. Rather, control potentiometer 38 is a component of the existing heating and cooling system, and is disposed for manipulation by a user to control the position of actuator 14. Control potentiometer 38 is also connected to a terminal 40, and resistors 42, 44, and 46 represent the internal resistance of the wiring of the heating and cooling system.

In order to drive actuator 14 to the position demanded by a particular setting of control potentiometer 38, the differential setpoint signal feeds into the circuitry of control module 10 via lines 48, 50, and 52. As can be seen, line 48 is connected to the differential setpoint signal present on the left side of control potentiometer 38, and lines 50 and 52 are connected to the differential setpoint signal present on the right side of control potentiometer 38. For purposes of convenience, the component of the differential setpoint signal present on the left side of control potentiometer 38 will be denoted as first setpoint signal 47. Similarly, the signal present on the right side of control potentiometer 38 will be denoted as second setpoint signal 49.

In order to produce a feedback signal which corresponds to the position of actuator 14, control module 10 also includes a feedback circuit 54 having a feedback potentiometer 56 which is coupled to reversible motor 12 by motor position feedback line 58. As shown in FIG. 1, feedback circuit 54 includes resistors 60, 62, 64, and 66, and a zener diode 68.

In practicing the present invention, and in contrast to prior motor control circuits, control potentiometer 38 and feedback potentiometer 56 are connected in isolated circuits. This allows the zero setting of control potentiometer 38 to be freely and independently calibrated using zero calibration potentiometer 28. In the illustrated embodiment, control module 10 provides this circuit isolation through the use of a pair of high impedance operational amplifiers 70 and 72. As shown in FIG. 1, amplifier 70 has resistors 74 and 76 connected to an inverting input 78, and resistors 80 and 82 connected to a non-inverting input 84. Amplifier 72 has an output 86 which feeds into non-inverting input 84 of amplifier 70 and also into an inverting input 88 of amplifier 72. Amplifier 72 also is connected to receive first setpoint signal 47 via line 48 through a non-inverting input 90.

In order to calibrate a desired open position of actuator 14 to a corresponding setting of control potentiometer 38, control module 10 also has a travel adjustment potentiometer or stroke adjustment potentiometer 92 which is connected to output 73 of amplifier 70 and to output 86 of amplifier 72 through a resistor 94. In the illustrated embodiment, travel adjustment potentiometer 92 scales the feedback signal from feedback potentiometer 56 to provide the corresponding desired open position of actuator 14. Amplifiers 70 and 72, in addition to providing the circuit isolation discussed above, also prevent cross-loading between travel adjustment potentiometer 92 and reference supply 19, so that travel adjustment potentiometer 92 can be adjusted without altering the zero setting of actuator 14.

In order to combine the differential setpoint signal and the feedback signal to produce an error signal, a high impedance operational amplifier 96 is provided which is connected through a resistor 95 to travel adjustment potentiometer 92. Amplifier 96 is connected to receive a signal from travel adjustment potentiometer 92 through an inverting input 98, and is connected to receive first setpoint signal 47 via line 48 through a non-inverting input terminal 100. Also, as can be seen in FIG. 1, amplifier 96 is connected to resistors 102 and 104, and input 98 is connected to receive second setpoint signal 48 Via line 50.

As will be explained in greater detail below, the error signal referred to above effectively represents the difference between the actual position of actuator 14 and the position demanded by control potentiometer 38. In order to drive actuator 14 to the desired position, control module 10 includes a comparator 108 which responds to the error signal and orders a directional logic system 116 to drive motor 12 to minimize the error signal. As shown in FIG. 1, amplifier 96 has an output 106 which feeds into comparator 108 through an input 110. Comparator 108 also is connected to receive second setpoint signal 48 via line 52 through an input 112. As will also be explained below, the signals received by inputs 110 and 112 represent the error signal, and is shown as an error signal 114.

Turning now to the operation of the control module of the present invention illustrated by the embodiment shown in FIG. 1, whenever a user manipulates control potentiometer 38 to position actuator 14, a differential setpoint signal represented as first and second setpoint signals 47 and 48 is provided from control potentiometer 38 and constant current sources 20 and 22. When the slidewire of control potentiometer 38 is located closest to the "W" terminal also denoted as terminal 36, actuator 14 is at a fixed closed position. In the often likely event that actuator 14 is not properly positioned at the zero or closed setting of control potentiometer 38, zero calibration potentiometer 28 of constant current source 20 is operable to calibrate the closed position of actuator 14 to correspond with the zero setting of control potentiometer 38. As the slidewire of control potentiometer 38 moves towards the "B" terminal also denoted as terminal 34, first and second setpoint signals 47 and 48 drive actuator 14 to an open position corresponding to the setting of control potentiometer 38. Because the slidewire of control potentiometer 38 has moved closer to terminal 34, first setpoint signal 47 has a value or level which is less than that of second setpoint signal 49. As can be seen in FIG. 1, first setpoint signal 47 feeds into non-inverting input 100 of amplifier 96 via line 48.

As control module 10 drives reversible motor 12 to position actuator 14, the feedback signal from feedback potentiometer 56 feeds into inverting input 78 of amplifier 70, through travel adjustment potentiometer 92, and into non-inverting input 98 of amplifier 96. Because actuator 14 originally was at the fixed closed position, the level of the feedback signal, which corresponds to the position of actuator 14, is at a minimum value. However, the feedback signal continues to increase in value as motor 12 drives actuator 14 to the open position demanded by the setting of control potentiometer 38. Amplifier 96 sums first setpoint signal 47 and the increasing feedback signal to produce an output signal from output 106. Until actuator 14 reaches the desired open position, the level of the output signal from output 106 will be less than the level of second setpoint signal 49 which feeds input 112 via line 52.

Because second setpoint signal 49 and the output signal from output 106 of amplifier 96 have different levels when motor 12 is positioning actuator 14, these signals are collectively referred to as error signal 114. As stated above, in effect, error signal 114 represents the difference between the actual position of actuator 14 and the position demanded by the setting of control potentiometer 38. As motor 12 drives actuator 14 to an open position corresponding to the setting of control potentiometer 38, error signal 114 continuously becomes smaller as actuator 14 reaches the desired position. Comparator 108 receives error signal 114 at inputs 110 and 112 and continues to send a driving signal to directional logic system 116 when the level of the signal present at input 110 is less than the level of the signal present at input 112, or, in other words, when error signal 114 has a value greater than zero. When actuator 14 reaches the open position demanded by the setting of control potentiometer 38, the level of the signal present at input 110 will be the same as the level of the signal present at input 112, and thus error signal 114 will be reduced to zero. When error signal 114 is reduced to zero, comparator 108 will send a signal to directional logic system 116 which will halt the operation of motor 12.

The operation of control module 10 is similar when the setting of control potentiometer 38 requires actuator 14 to return from an open position to the fixed closed position. For example, when actuator 14 is at an open position, and the slidewire of control potentiometer 38 is moved towards terminal 36, the differential setpoint signal requires motor 12 to operate in the reverse direction. However, in contrast to the operation described above, when actuator 14 is at an open position, first setpoint signal 47 has a value or level greater than the level of second setpoint signal 49. Similarly, when actuator 14 is at an open position, the feedback signal is at a higher value. Thus, the output signal from output 106 of amplifier 96 which is present at input 110 is at a greater level than second setpoint signal 49 which is present at input 112. Because the signals present at inputs 110 and 112 have different values, error signal 114 has a value not equal to zero. Thus, until the value of error signal 114 reaches zero, comparator 108 will send a signal to directional logic system 116 to drive reversible motor 12 in the counterclockwise direction to position actuator 14. When actuator 14 reaches the fixed closed position, error signal 114 will be zero and motor 12 will halt.

Figure 3:
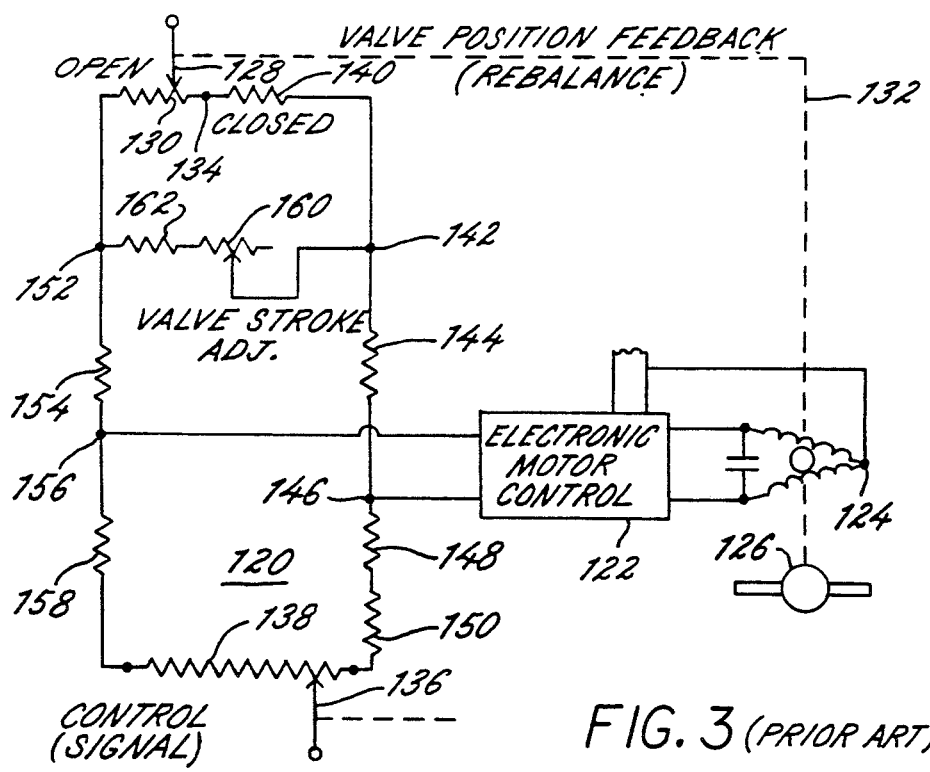
FIG. 3 is a schematic diagram of a prior art motor control circuit.

In order to avoid the problems which exist in the prior art motor control circuits discussed above, the illustrated embodiment of the present invention as shown in FIG. 1 uses a non-bridge type circuit. That is, control potentiometer 38 is not connected in a typical Wheatstone bridge circuit with position feedback potentiometer 56 and travel or stroke adjustment potentiometer 92 similar to the prior art motor control circuit shown in FIG. 3. Thus, in accordance with the present invention, control module 10 shown in FIG. 1 allows adjustments to be made to stroke adjustment potentiometer 92 which do not alter the zero setting or closed position of actuator 14. Further, the fixed closed position or zero setting of actuator 14 can be calibrated with zero calibration potentiometer 28 to establish the zero setting independent of any adjustments to stroke adjustment potentiometer 92. In order to provide these features, the present invention uses a non-bridge circuit design which includes amplifiers 70, 72 and 96.

Figure 2:
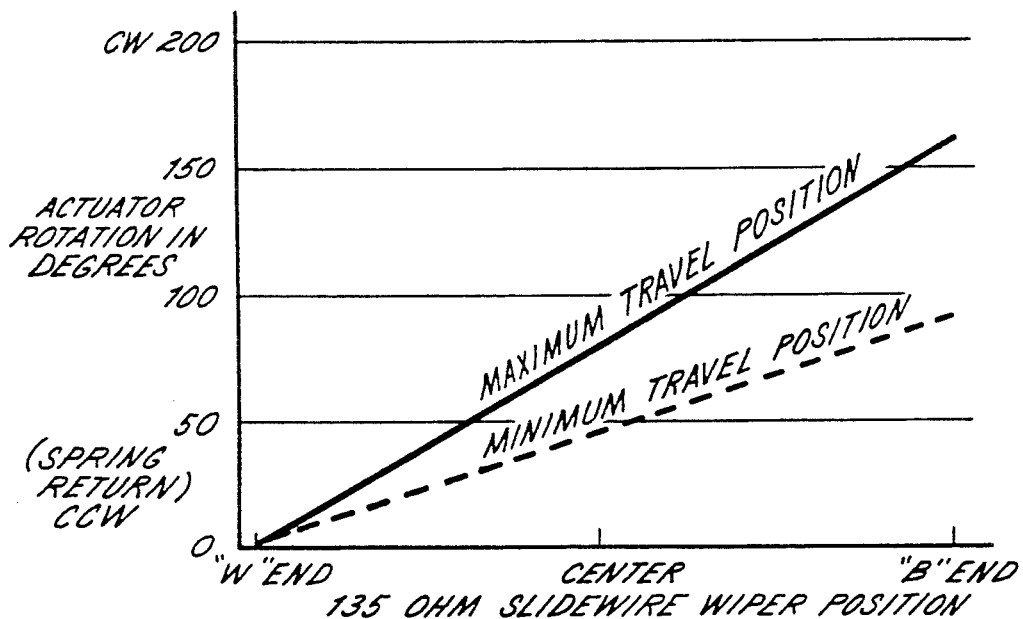
FIG. 2 is a graphical representation of certain operating characteristics of the control module of FIG. 1.

In FIG. 2, a graphical representation of the operation of the control module of the present invention is presented. FIG. 2 demonstrates the independence of adjustments to travel adjustment potentiometer 92 and the zero setting or closed position of actuator 14. As shown in FIG. 2, when control potentiometer 38 is at the "W" end (terminal 36), the closed position of actuator 14 remains fixed regardless of adjustments made to travel adjustment potentiometer 92. Thus, as stated in greater detail below, travel adjustment potentiometer 92 scales the feedback signal to produce a range of desired open positions between the minimum travel position and maximum travel position shown in FIG. 2 which correspond to various settings of control potentiometer 38.

In keeping with the present invention, a reference signal corresponding to the level of first setpoint signal 47 is provided to travel adjustment potentiometer 92, so that the feedback signal scaled by travel adjustment potentiometer 92 is also referenced to first setpoint signal 47. Thus, the voltage difference across travel adjustment potentiometer 92 corresponds only to the feedback signal, but is referenced with respect to first setpoint signal 47. By providing this reference signal, the non-bridge design of control module 10 prevents cross-loading between travel adjustment potentiometer 92 and constant current sources 20 and 22 so that zero and stroke adjustments can be made independently.

Amplifiers 70, 72 and 96 are used in control module 10 to provide this reference signal. As stated above, the level of first setpoint signal 47 present at non-inverting input 100 of amplifier 96 changes depending on the setting of control potentiometer 38. Thus, when the setting of control potentiometer 38 changes, the signal present at non-inverting input 100 changes, and in the absence of any compensation, the feedback signal present at inverting input 98 of amplifier 96 would be summed with respect to a varying reference signal which would disrupt the desired operation of control module 10. Therefore, it is the function of amplifiers 70 and 72 to compensate for the variations in first setpoint signal 47, which acts as a reference signal with respect to the signals present at amplifier 96.

Amplifier 72 is configured as a unity gain amplifier, and has non-inverting input 90 which receives first setpoint signal 47, so that amplifier 72 produces an output signal at output 86 which is equal to first setpoint signal 47. That output signal is applied to the lower connection of stroke adjustment potentiometer 92 through resistor 94. The output signal of amplifier 72 is also applied as an input to non-inverting input 84 of amplifier 70 through resistors 80 and 82 which are configured as a voltage divider. Amplifier 70 is configured such that it can produce an output signal at output 73 which is also equal to first setpoint signal 47 when the feedback signal is not present. As can be seen, the output signal of amplifier 70 is applied to the upper connection of stroke adjustment potentiometer 92. Assuming that the feedback signal is zero, amplifiers 70 and 72 create a signal across stroke adjustment potentiometer 92 which has a magnitude of zero. Thus, regardless of changes in the level of first setpoint signal 47, amplifiers 70 and 72 create a signal across stroke adjustment potentiometer 92 which is identical to the signal applied to non-inverting input 100 of amplifier 96.

When considering the presence of the feedback signal, as can be seen, the feedback signal is applied to inverting input 78 of amplifier 70 and thus shifts the output signal of amplifier 70. Therefore, the only signal that changes the signal magnitude across travel adjustment potentiometer 92 is the feedback signal from feedback potentiometer 56. The output signal of amplifier 70 creates a voltage difference across travel adjustment potentiometer 92 which corresponds only to the feedback signal but which is referenced to first setpoint signal 47. Depending on the setting of travel adjustment potentiometer 92, a portion of that voltage will feed through travel adjustment potentiometer 92 and be summed into inverting input 98 of amplifier 96 against the same reference signal (first setpoint signal 47) established across travel adjustment potentiometer 92. It should be noted that the reference signal established across travel adjustment potentiometer 92 corresponding to first setpoint signal 47 does not disturb the desired independence of zero and stroke adjustments. Thus, travel adjustment potentiometer 92 can be adjusted to produce a range of desired open positions between the minimum and maximum travel positions of actuator 14.

The illustrated embodiment of the present invention shown in FIG. 1 and discussed above is also suitable for use as a replacement control module. As discussed in the Background Of The Invention, when control circuits are used for replacement purposes, variations such as the unknown resistance of the wiring of the heating and cooling system can significantly affect the operation of the control circuit. However, the design of the preferred embodiment of the present invention compensates for such problems so that the desired operation of the control circuit can be maintained even in a replacement setting.

For example, resistors 42, 44, and 46 which are denoted as $r_a$, $r_b$, and $r_c$, respectively in FIG. 1, represent the unknown resistance of the wiring of the heating and cooling system. Control potentiometer 38 is also a component of the existing heating and cooling system. As can be seen in FIG. 1, control module 10 is connected to control potentiometer 38 and the existing heating and cooling system at terminals 34 and 36 respectively. In prior art motor control circuits, the wiring resistance would most likely affect the operation of the control circuit. However, in the present invention, control module 10 compensates for this resistance so that the resistance does not affect the desired operation of the control system. This is done through the use of amplifiers 70, 72, and 96 in the same manner that the reference signal is provided across travel adjustment potentiometer 92 as described above. For example, if the resistance of resistors 42, 44, or 46 offset or vary the differential setpoint signal, this variation will be referenced throughout control module 10 exactly as is done when compensating for variations in the level of first setpoint signal 47. Thus, any variation in the wiring resistance of the heating and cooling system will not disturb the desired operation of control module 10.

It should be noted that the illustrated embodiment of the present invention includes two current sources as the reference supply so that the control module can be used in a replacement setting. As shown in FIG. 1, each end of control potentiometer 38 is connected to an independent current source, so that the existing wiring of the heating and cooling system does not disrupt the desired operation of the control module. However, in an alternative embodiment, a reference supply comprising only a single current source could used. For example, if one end of the control potentiometer were grounded, with the other end being connected to the single current source, a unitary setpoint signal could be taken from the control potentiometer, rather than a differential signal. Further, current sources are examples only, but preferred examples of devices for configuring the reference supply.

As is evident from the foregoing description, the present invention allows the performance of a quick and uncomplicated calibration of the zero setting of an actuator or other load device in a heating and cooling system which is independent of stroke adjustments, even when the control module of the present invention is used in a replacement setting.

We claim:

1. In a heating and cooling system having a control potentiometer disposed for manipulation by a user to control the position of a remote actuator in the system between open and closed positions, a quick-calibrate control module for responding to setpoint signals from the control potentiometer to drive the actuator to corresponding positions, the control module comprising, in combination:
   a motor coupled to the actuator and a feedback potentiometer coupled to the motor for producing a feedback signal relating to the actuator position;
   summing means for combining the setpoint signal and the feedback signal to produce an error signal;
   means responsive to the error signal for driving the motor to minimize the error signal;
   a reference supply connected to the control potentiometer, the reference supply including zero setting means for adjusting the setpoint signal to produce an error signal which calibrates the closed position of the actuator to a corresponding setting of the control potentiometer;
   scaling means for scaling the feedback signal to produce an error signal which calibrates a desired open position of the actuator with a corresponding setting of the control potentiometer; and
   means for establishing a common reference related to the setpoint signal to prevent cross loading between the reference supply and the scaling means, so that the scaling means can be adjusted without altering the zero setting of the actuator.

2. The control of module of claim 1 wherein the reference supply comprises at least one constant current source.

3. The control of module of claim 1 wherein the summing means comprises a high impedance amplifier.

4. The control of module of claim 1 wherein the means responsive to the error signal comprises a comparator.

5. The control module of claim 1 wherein the means for establishing a common reference comprises high impedance amplifier means operable for providing circuit isolation between the reference supply and the scaling means to prevent cross loading.

6. The control module of claim 5 wherein the high impedance amplifier is connected to the feedback potentiometer so that the feedback signal is referenced with respect to the setpoint signal.

7. The control module of claim 6 wherein the high impedance amplifier is connected to the scaling means, the scaling means being connected to receive the referenced feedback signal for scaling the feedback signal.

8. The control module of claim 7 wherein the scaling means is connected to the summing means, the summing means being connected to receive the scaled feedback signal and combine it with the setpoint signal.

9. The control module of claim 1 wherein the scaling means comprises a stroke adjustment potentiometer operable to be adjusted to produce a range of desired open positions of the actuator without altering the zero setting of the actuator.

10. A replacement control module for a heating and cooling system having a control potentiometer for establishing a setpoint signal, the control potentiometer being of the type having at least two terminals connectable in a bridge circuit adapted to be balanced to control the position of an actuator, the replacement control module controlling the position of an actuator between closed and open positions in response to settings of the control potentiometer, the replacement control module comprising, in combination:
   a pair of constant current sources connected to the respective terminals of the control potentiometer to produce a differential first and second signal having levels dependent on the setting of the control potentiometer, and zero setting means associated with the constant current sources for calibrating the closed position of the actuator to a corresponding setting of the control potentiometer;
   means for establishing a common reference related to the level of the first signal;
   a feedback circuit being connected to the common reference for receiving a feedback signal and producing a referenced feedback signal;
   summing means connected to the common reference for combining the referenced feedback signal and the first and second signals to produce an error signal;
   a motor coupled to a feedback potentiometer for producing the feedback signal which corresponds to the actuator position, the motor being coupled to the actuator and responsive to the error signal for positioning the actuator in response to settings of the control potentiometer; and
   scaling means for scaling the referenced feedback signal to produce an error signal which calibrates a desired open position of the actuator with a corresponding setting of the control potentiometer.

11. The replacement control module of claim 10 wherein the means for establishing a common reference is connected to prevent cross-loading between the pair of constant current sources and the scaling means, so that the scaling means can be adjusted without altering the zero setting of the actuator.

12. The replacement control module of claim 10 wherein the means for establishing a common reference and the summing means are connected to prevent the wiring resistance of the heating and cooling system from affecting the error signal.

13. The replacement control module of claim 10 and further comprising a comparator responsive to the error signal for driving the motor to minimize the error signal.

14. The replacement control module of claim 11 wherein the means for establishing a common reference comprises high impedance amplifier means.

15. The replacement control module of claim 14 wherein the high impedance amplifier means comprise a pair of high impedance amplifiers connected to receive the first signal, one of the amplifiers being connected to receive the feedback signal, the pair of amplifiers having outputs connected to provide a reference signal across the scaling means corresponding to the level of the first signal so that the feedback signal is referenced to the first signal, thereby establishing the common reference related to the level of the first signal.

16. The replacement control module of claim 10 wherein the summing means comprises high impedance amplifier means, the amplifier means having a first input connected to receive the first signal and a second input connected to receive the second signal and the scaled, referenced feedback signal from the scaling means to produce the error signal.

17. The replacement control module of claim 11 wherein the scaling means comprises a stroke adjustment potentiometer which can be adjusted to produce a range of desired open positions of the actuator without altering the zero setting of the actuator.

* * * * *